(12) United States Patent
Mizuno et al.

(10) Patent No.: US 9,108,537 B2
(45) Date of Patent: Aug. 18, 2015

(54) VEHICLE SEAT APPARATUS WITH MIDDLE RETURN SLIDE WALK IN

(71) Applicant: AISIN TECHNICAL CENTER OF AMERICA, INC., Plymouth, MI (US)

(72) Inventors: Ryosuke Mizuno, Novi, MI (US); Michael Mixon, Plymouth, MI (US)

(73) Assignee: AISIN TECHNICAL CENTER OF AMERICA, INC., Plymouth, MI (US)

( * ) Notice: Subject to any disclaimer, the term of this patent is extended or adjusted under 35 U.S.C. 154(b) by 0 days.

(21) Appl. No.: 13/916,222

(22) Filed: Jun. 12, 2013

(65) Prior Publication Data

US 2014/0368013 A1     Dec. 18, 2014

(51) Int. Cl.
| | |
|---|---|
| B60N 2/02 | (2006.01) |
| B60N 2/12 | (2006.01) |
| B60N 2/07 | (2006.01) |
| B60N 2/20 | (2006.01) |
| B60N 2/08 | (2006.01) |
| B60N 2/22 | (2006.01) |

(52) U.S. Cl.
CPC .............. *B60N 2/123* (2013.01); *B60N 2/0727* (2013.01); *B60N 2/08* (2013.01); *B60N 2/12* (2013.01); *B60N 2/20* (2013.01); *B60N 2/22* (2013.01); *B60N 2002/126* (2013.01)

(58) Field of Classification Search
CPC .......... B60N 2/0727; B60N 2/08; B60N 2/12; B60N 2/22; B60N 2/123; B60N 2/20; B60N 2002/126
USPC .................... 297/331, 334, 340, 341, 344.11, 297/378.12, 378.14
See application file for complete search history.

(56) References Cited

U.S. PATENT DOCUMENTS

| | | | | |
|---|---|---|---|---|
| 5,407,165 | A * | 4/1995 | Balocke | 248/429 |
| 5,740,999 | A * | 4/1998 | Yamada | 248/429 |
| 5,882,074 | A * | 3/1999 | Kojima | 297/341 |
| 5,899,532 | A | 5/1999 | Paisley et al. | |
| 6,048,030 | A * | 4/2000 | Kanda et al. | 297/341 |
| 6,619,741 | B1 | 9/2003 | Tame | |
| 7,195,303 | B2 * | 3/2007 | Nihonmatsu et al. | 296/65.13 |
| 7,926,875 | B2 * | 4/2011 | Schmale | 297/344.11 |

(Continued)

FOREIGN PATENT DOCUMENTS

| | | |
|---|---|---|
| DE | 10 2004 042 038 A1 | 3/2006 |
| JP | 2000-190760 A | 7/2000 |

(Continued)

OTHER PUBLICATIONS

U.S. Appl. No. 13/856,270, filed Apr. 3, 2013, Mizuno, et al.

(Continued)

*Primary Examiner* — Daniel J Troy
*Assistant Examiner* — Ryan A Doyle
(74) *Attorney, Agent, or Firm* — Oblon, Spivak, McClelland, Maier & Neustadt, L.L.P.

(57) ABSTRACT

A slide return mechanism of a seat for a vehicle, the seat including a seat back and a seat base, the slide return mechanism including a recliner that reclines the seat back, a slide release lever that locks and unlocks the movement of a slide mechanism of the seat, and a stopper link. Rotation of the recliner causes the seat back to move downward, the slide release lever to unlock the slide mechanism, and the stopper link to move into position to prevent the seat from traveling in a rearward direction at a predetermined position.

7 Claims, 8 Drawing Sheets

(56) References Cited

U.S. PATENT DOCUMENTS

| | | | |
|---|---|---|---|
| 2004/0113473 A1* | 6/2004 | Kojima | 297/341 |
| 2008/0084085 A1* | 4/2008 | Mizuno et al. | 296/65.13 |
| 2008/0309136 A1* | 12/2008 | Kojima et al. | 297/340 |
| 2011/0127818 A1 | 6/2011 | Hazlewood | |
| 2013/0113260 A1 | 5/2013 | Kojima | |

FOREIGN PATENT DOCUMENTS

| | | | |
|---|---|---|---|
| WO | WO 2008/035803 A1 | 3/2008 | |
| WO | WO 2011/041911 A1 | 4/2011 | |
| WO | WO 2012/096357 A1 | 7/2012 | |

OTHER PUBLICATIONS

U.S. Appl. No. 13/948,934, filed Jul. 23, 2013, Mixon et al.

Extended European Search Report issued Nov. 20, 2014 in Patent Application No. 14169815.9.

Office Action issued on Feb. 10, 2015 in the corresponding Japanese Patent Application No. 2014-041792 (with English Translation).

* cited by examiner

VEHICLE SEAT APPARATUS WITH MIDDLE RETURN SLIDE WALK IN

CROSS REFERENCE TO RELATED APPLICATIONS

Background of the Invention

1. Field of the Invention

Exemplary aspects of the present invention relate to the recliner function of a vehicle seat and in particular to the recliner return walk in mechanism.

2. Description of the Related Art

Seats of a vehicle such as an automobile may be provided with a reclining mechanism that allows the seat back to pivot at a base portion thereof. One type of reclining mechanism allows the seat back to pivot to a forward position to allow the ingress and egress of passengers behind the seat. This reclining mechanism has several defined positions including: a neutral position, an upright position, a rear most position, and a front most position; where the ingress/egress of passengers behind occurs at the front most position.

When a user desires to ingress or egress the vehicle a "walk-in" procedure is performed. Essentially, the seat back is brought forward via a reclining mechanism (recliner) system and then the seat is moved forward via a seat sliding mechanism. Once the seat has reached its forward-most position the user can more easily enter or exit a rear seat of the vehicle. An example of a walk-in procedure as described above is U.S. patent application Ser. No. 13/667,495, filed on Nov. 2, 2012, which is herein incorporated by reference.

When the egress/ingress is completed by the user, the walk-in procedure is reversed. The seat is moved rearward via the sliding mechanism and is stopped at neutral position in the fore-aft direction. Then the seat back is rotated back to an upright position and locked in place.

A walk-in stopper mechanism is the mechanism that stops the rearward motion of the seat when moving via the sliding mechanism. The walk-in stopper mechanism prevents the seat from traveling rearward and facilitates the seat back returning to the upright position. However, the walk-in stopper mechanism is typically complicated and resides outside of the seat rails of the vehicle.

SUMMARY OF THE INVENTION

A slide return mechanism of a seat for a vehicle, the seat including a seat back and a seat base, the slide return mechanism including a recliner that reclines the seat back, a slide release lever that locks and unlocks the movement of a slide mechanism of the seat, and a stopper link. Rotation of the recliner causes the seat back to move downward, the slide release lever to unlock the slide mechanism, and the stopper link to move into position to prevent the seat from traveling in a rearward direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
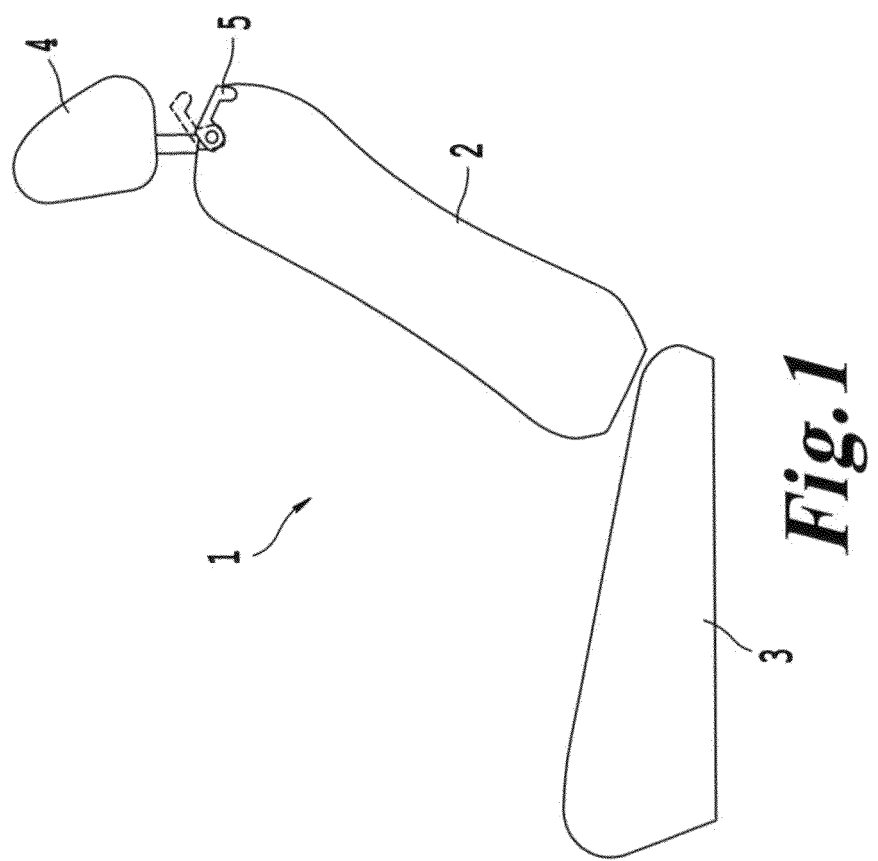
FIG. 1 illustrates a view of vehicle seat.

Referring now to the drawings, wherein like reference numerals designate identical or corresponding parts throughout the several views. Further, as used herein, the words "a," "an" and the like generally carry a meaning of "one or more," unless stated otherwise.

FIGS. 1-8 depict various aspects of a middle return slide walk-in mechanism for a vehicle seat. Here a vehicle refers to a land vehicle exemplified by an automobile. However, the present disclosure is also applicable to any similar type vehicle, such as but not limited to, a sport utility vehicle, a pickup truck, a commercial vehicle or the like.

FIG. 1 illustrates schematically a vehicle seat 1 in accordance with the present disclosure. The vehicle seat 1 includes a seat base 3, a seat back 2, a head rest 4, and a shoulder lever 5. The seat base 3 is provided a lower portion of the vehicle seat 1 taken in a vehicle height direction The seat base 3 is attached to the vehicle through lower supports (not illustrated). The seat base 3 being configured for an occupant to sit upon.

The seat back 2 is attached to the seat base 3 at a lower portion of the seat back 2. The seat back 2 is rotatable relative to the seat base 3 so that the seat back 2 pivots in forward and rearward directions. Seat back 2 typically moves in a fore-aft direction of the vehicle. The seat back 2 is configured for an occupant to rest their back against.

Attached at a top portion of the seat back 2 is a head rest 4. The head rest 4 protects the occupant from injury in the event of an accident.

The seat back 2 also includes the shoulder lever 5 at the top portion thereof. The shoulder lever 5 is operable between a closed state and a released state. The shoulder lever 5 is an example of a walk-in release lever which begins a walk-in process for a user to enter or exit the vehicle. When the shoulder lever 5 is operated, the recliner lock is released. The release of the recliner 14 allows the seat back 2 to rotate. Accordingly, the seat back 2 is made to pivot forward toward the seat base 3 via a bias force provided by a spring.

Figure 2:
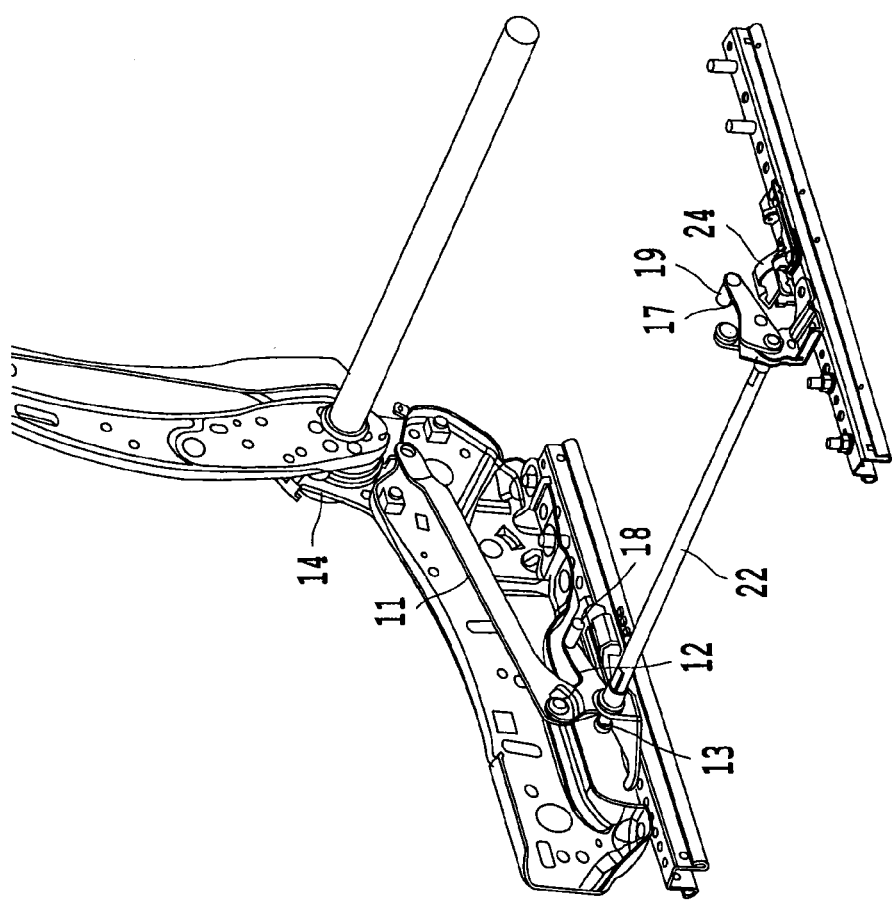
FIG. 2 illustrates an isometric view of a walk-in device in accordance with an exemplary aspect of the disclosure.

FIG. 2 illustrates aspects of the middle walk-in return mechanism. The mechanism includes an inner side which corresponds to inner rail 21 and an outer side which corresponds to outer rail 20.

Figure 3:
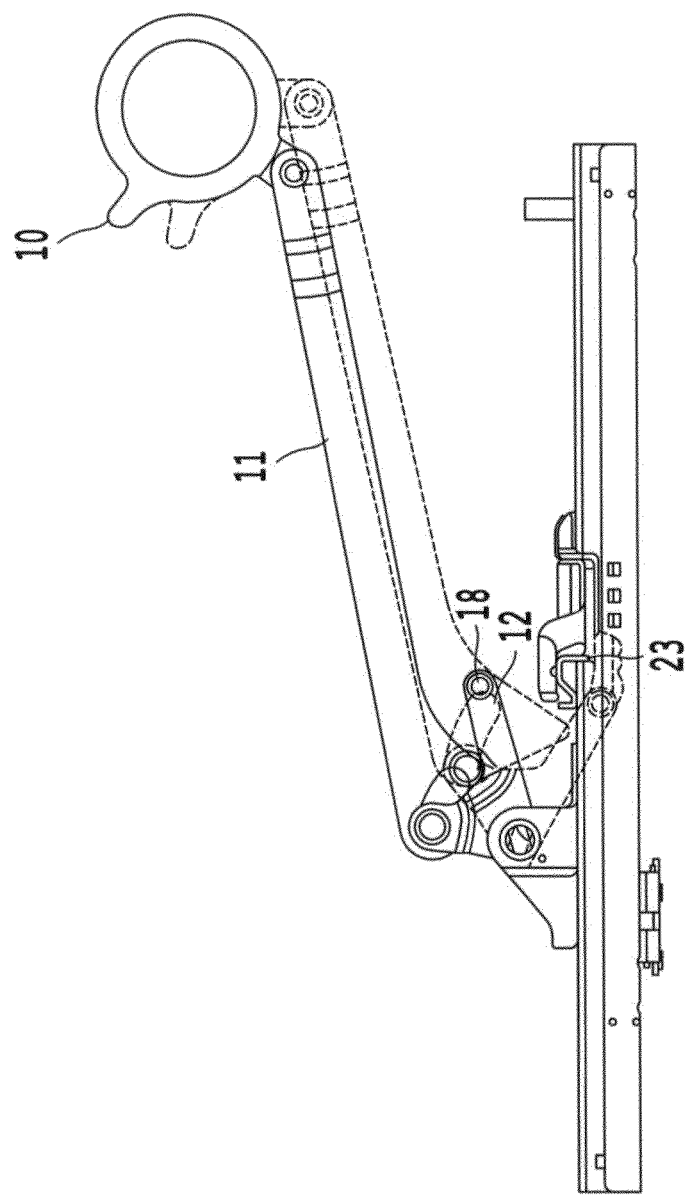
FIG. 3 illustrates a side view of a walk-in device in accordance with an exemplary aspect of the disclosure.
Figure 4:
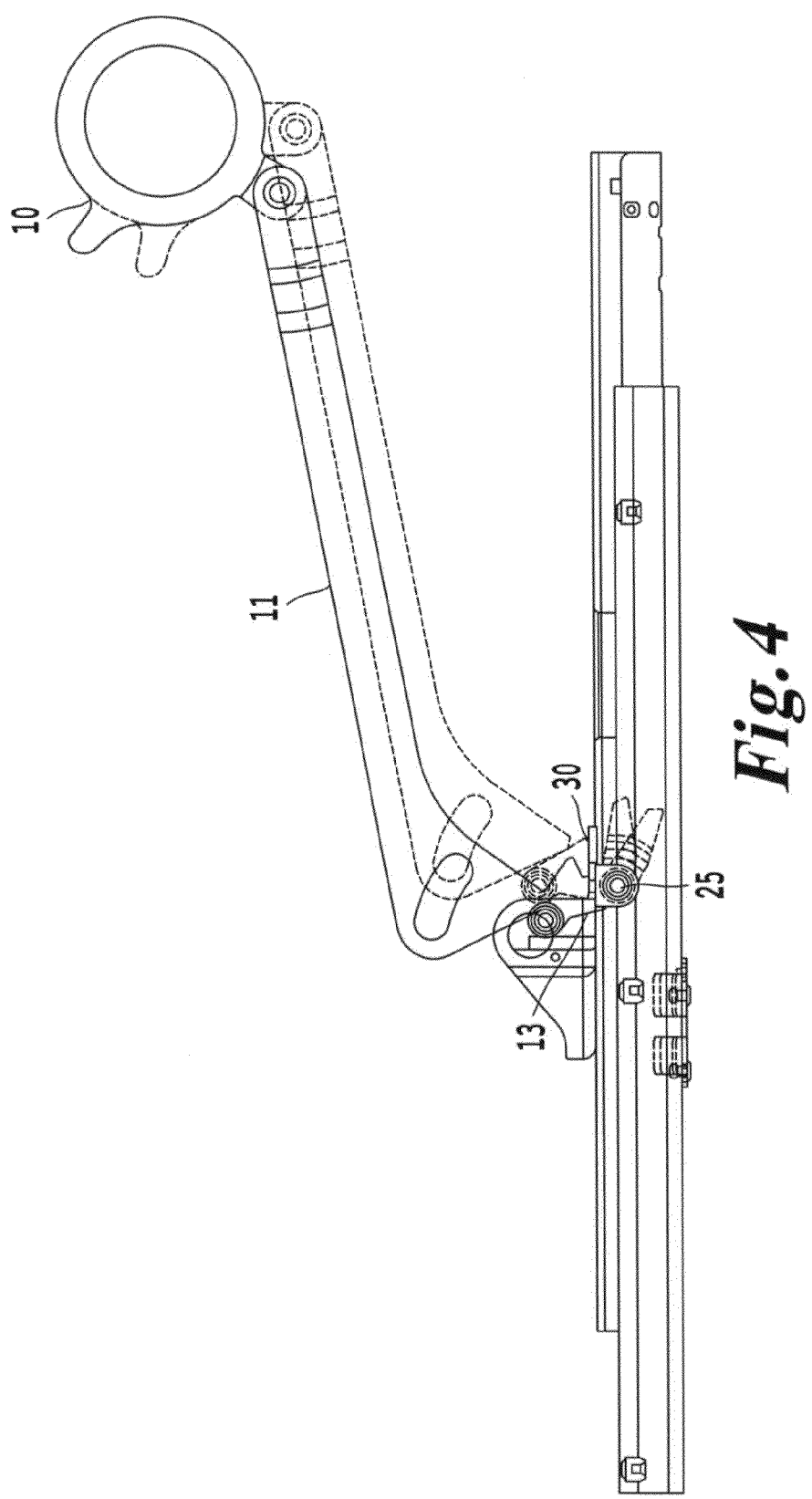
FIG. 4 illustrates a side view of a walk-in device in accordance with an exemplary aspect of the disclosure.

Regarding the inner side, FIGS. 2, 3, and 4 illustrate a rotation link 10 attached to a recliner link 11. When the recliner 14 is released and the rotation link 10 is rotated by the seat back 3 a predetermined distance, then the rotation link 10 pulls the recliner link 11. This movement is shown in FIG. 5 by the recliner link 11 moving rightward in the figure.

The recliner link 11 is attached at one end to the rotation link 10. At an opposite end of the recliner link 11, the recliner link 11 is attached to a slide release lever 12. The movement of the recliner link 11 by the rotation link 10 causes the slide release lever 12 to rotate downward around a pivot point, as shown by the dashed lines in FIG. 3.

Figure 5:
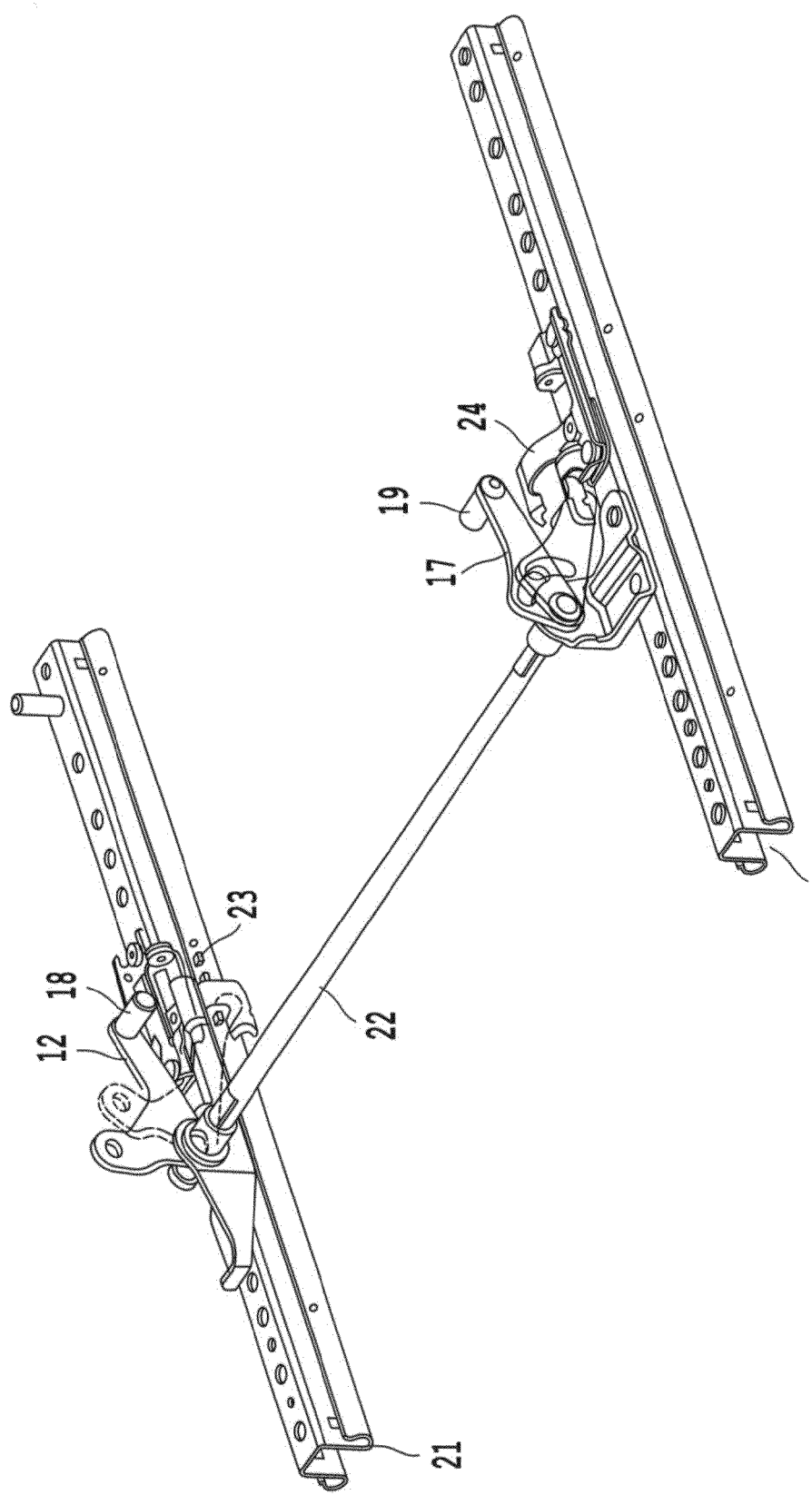
FIG. 5 illustrates an isometric view of a walk-in device in accordance with an exemplary aspect of the disclosure.

Shown in FIGS. 3 and 5, the slide release lever 12 includes a lock pin 18 which extends inward from the slide release lever 12. The lock pin 18 engages with a slide mechanism lock 23 which is part of the inner side of the seat 1. The downward rotation of the slide release lever 12, due to the recliner link 11 being pulled by the rotation link 10, causes the lock pin 18 to disengage the slide mechanism lock 23. Once the lock pin 18 has disengaged the slide mechanism lock 23, the inner side sliding mechanism is unlocked.

Figure 8:
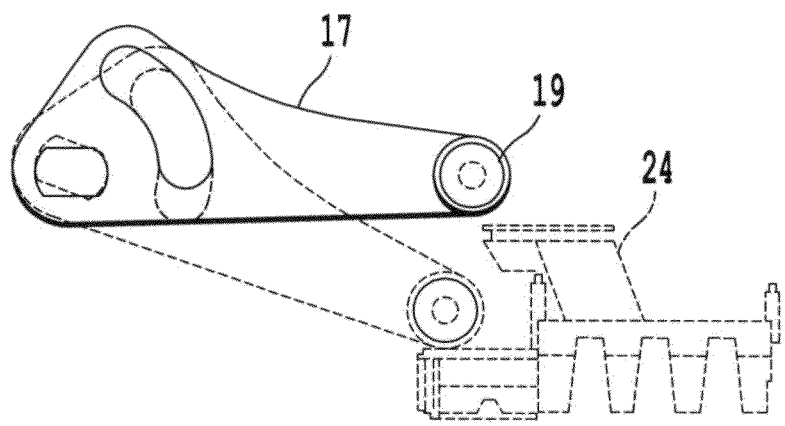
FIG. 8 illustrates a side view of a walk-in device in accordance with an exemplary aspect of the disclosure.

Shown in FIG. 5, the slide release lever 17 is on the outer side associated with outer rail 20. The slide release lever 17 includes a lock pin 19 which extends inward from the slide release lever 17. The lock pin 19 engages with a slide mechanism lock 24 as illustrated in FIGS. 5 and 8. The downward rotation of the slide release lever 17 causes the lock pin 19 to disengage the slide mechanism lock 24. Once the lock pin 18 has disengaged the slide mechanism lock 24, the outer side sliding mechanism is unlocked.

FIG. 5 illustrates the slide release levers 12 and 17 are connected by a center rotation tube 22. Any movement imparted to the slide release lever 12 by the recliner link 11 also moves the slide release lever 17 via the center rotation tube 22. When both the inner side and outer side sliding mechanisms are unlocked the seat 1 is free to slide in the fore-aft direction. Once the slide mechanism is released form the locked state, a user may move the seat forward in the fore-aft direction in order to egress or ingress.

Figure 6:
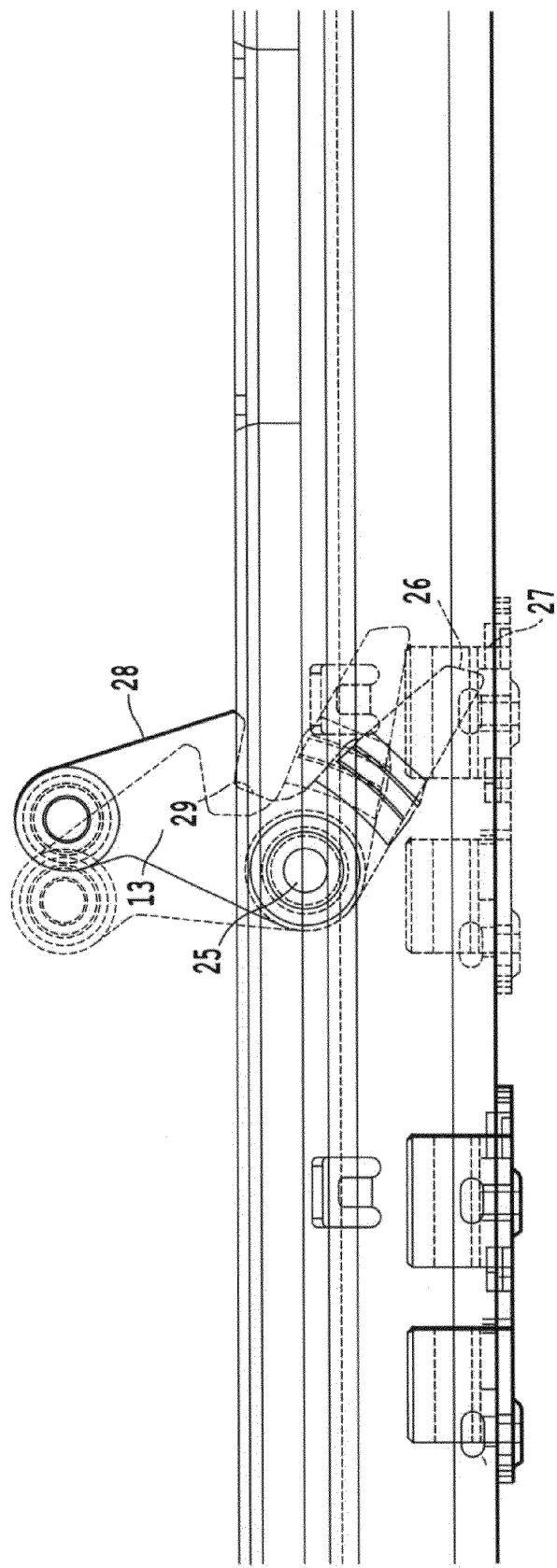
FIG. 6 illustrates a side view of a walk-in device in accordance with an exemplary aspect of the disclosure.
Figure 7:
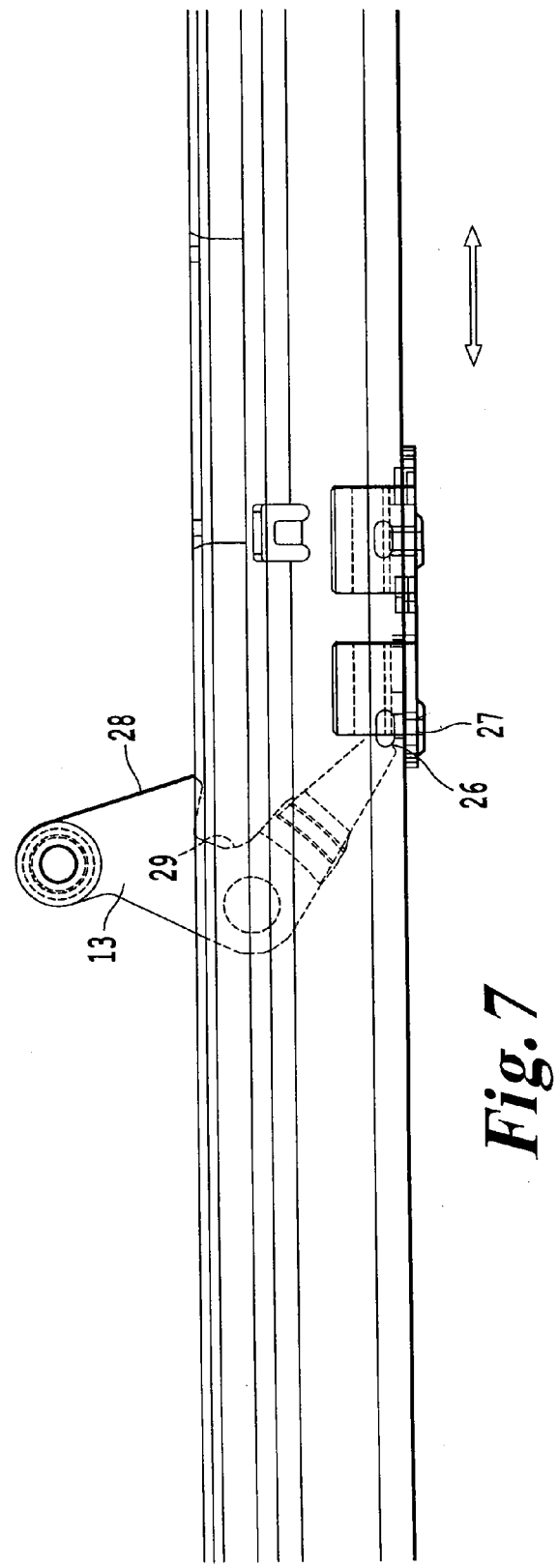
FIG. 7 illustrates a side view of a walk-in device in accordance with an exemplary aspect of the disclosure.

As shown in FIGS. 4, 6, and 7, a stopper link 13 is provided to the inner side of the seat 1. The stopper link 13 stops the movement of the track at a middle position, especially during the return of a walk-in process. The stopper link 13 includes a top portion 28 and bottom portion 26. The top portion 28 is configured to contact an end of the recliner link 11. The stopper link 13 is held in contact with the recliner link 11 by a bias force rotating the stopper link 13 toward the recliner link 11. Whereas the bottom portion 26 contacts a slide stopper 27 provided to the seat 1 on the inner side.

The stopper link 13 also includes a middle portion 29 that is between the top portion 28 and the bottom portion 26. The middle portion 29 is configured to contact stopper 30 which is provided to the seat 1 on the inner side. Operation of the stopper link 13 will now be described in view of FIGS. 6 and 7.

As described above the movement of the recliner link 11 causes the slide release levers 12 and 17 to release the respective inner and outer side slide mechanisms. During the walk-in procedure, the seat 1 is capable of traveling forward once the slide mechanism is released.

FIG. 4 shows the movement of the recliner link 11 rightward (dashed lines) based on the rotation of the rotation link 10 during the walk-in procedure. The stopper link 13 is held in contact with the recliner link 11 due to a bias force on the stopper link 13 causing a clockwise rotation of the stopper link 13 about axis 25. As the recliner link 11 moves to release the slide release lever 12, the recliner link 11 begins to assert a force on the upper portion 28 of the stopper link 13. The continued movement of the recliner link 11 causes the stopper link 13 to rotate about the axis 25. Therefore, the stopper link 13 rotates down so that the lower portion 26 is operable to contact the slide stopper 27.

When slide mechanism of the seat 1 is release and the seat is begins sliding forward to permit the egress/ingress of the user, the stopper link 13 is configured so that the stopper link 13 can slide over the slide stopper 27 (Shown in FIG. 6), only when the seat is traveling in the forward direction. As shown in FIG. 6, the stopper link 13 has an inclined surface that allows the stopper link 13 to slide over the slide stopper 27. Once the stopper link 13 clears the slide stopper 27 the stopper link 13 returns to the fully down position.

After the user enters or exits the vehicle the walk-in return procedure is performed. The seat begins at a forward position with regard to the slide mechanism, and a forward reclined position with regard to the recline mechanism. Next, the user move the seat 1 rearward in the vehicle to return the seat to the middle or neutral position.

When the seat 1 reaches the middle position, the lower portion 26 of the stopper link 13 contacts the slide stopper 27, thereby causing the slide mechanism to stop its rearward progress (Shown in FIG. 7). FIG. 4 illustrates that the seat 1 is provided with a stopper 30 which contacts the middle portion 29 of the stopper link 13. The stopper 30 prevents further rotation of the stopper link 13 due to a bias force of a spring (not illustrated) on the seat back 2.

When the rearward sliding motion is stopped by the stopper link 13, the seat back 2 will rotate back to the upright position. The motion of the seat back 2 will rotate the rotation link 10, which will cause the recliner link 11 to move in the opposite direction depicted in FIG. 4. This movement of the recliner link 11 releases downward force on the slide release lever 12. Therefore, the slide release levers 12 and 17 move upward due to a bias spring (not shown) and the respective lock pins 18 and 19 lock into position in the respective lock mechanisms. Accordingly, the slide mechanism on the inner and outer sides of the seat are locked at the position determined by the stopper link 13.

Therefore, the mechanism described in detail above can provide a middle return slide walk-in feature at a low cost and low mass. Relatively few parts are utilized to effect this function. Also, many of the parts are between the tracks and not visible from outside, less visible components being preferable to a vehicle buyer.

Obviously, numerous modifications and variations of the present invention are possible in light of the above teachings. It is therefore to be understood that within the scope of the appended claims, the invention may be practiced otherwise than as specifically described herein.

The invention claimed is:

1. A slide return mechanism of a seat for a vehicle, the seat including a seat back and a seat base, the slide return mechanism comprising:
    a recliner that reclines the seat back;
    a slide release lever that locks and unlocks the movement of a slide mechanism of the seat;
    a recliner link that extends between the recliner and the slide release lever;
    a slide stopper on a rail of the seat; and
    a stopper link including a top portion that contacts the recliner link, a pivot point about which the stopper link rotates, a bottom portion configured to contact the slide stopper, and a surface that extends between the pivot and the bottom portion,
    wherein rotation of the recliner causes the seat back to move downward, the slide release lever to unlock the slide mechanism, and the stopper link to rotate about an axis to lower the bottom portion into a position to prevent the seat from traveling in a rearward direction at a predetermined position,
    wherein in a forward direction, the surface of the stopper link contacts the slide stopper causing the stopper link to rotate about the pivot and the stopper link to slide over the slide stopper, and wherein in the rearward direction, the bottom portion of the stopper link contacts the slide stopper at the predetermined position.

2. The slide return mechanism according to claim 1, wherein the rotation of the recliner moves the recliner link to cause the slide release lever to unlock.

3. The slide return mechanism according to claim 2, wherein the rotation of the recliner moves the recliner link to contact the stopper link to move the stopper link into position to prevent the seat from traveling in the rearward direction.

4. The slide return mechanism according to claim 1,
wherein when the stopper link contacts the slide stopper during rearward movement of the seat, the seat stops traveling in the rearward direction and the seat back is brought upward thereby causing the slide release lever to lock the movement of the slide mechanism of the seat.

5. The slide return mechanism according to claim 4, wherein the upward movement of the seat back causes the recliner to rotate in a second direction which moves the recliner link to remove a force on the slide release lever to cause a bias force to move the slide release lever to lock the movement of the slide mechanism of the seat.

6. The slide return mechanism according to claim 1, wherein the bottom portion of the stopper link contacts the slide stopper to prevent the seat from traveling in the rearward direction at the predetermined position.

7. The slide return mechanism according to claim 1, wherein the slide release lever unlocks the slide mechanism by rotating in an axis substantially perpendicular to the rail.

* * * * *